United States Patent
Do

(10) Patent No.: US 10,133,549 B1
(45) Date of Patent: Nov. 20, 2018

(54) SYSTEMS AND METHODS FOR IMPLEMENTING A SYNCHRONOUS FIFO WITH REGISTERED OUTPUTS

(71) Applicant: KYOCERA Document Solutions Inc., Osaka (JP)

(72) Inventor: Thien-Phuc Nguyen Do, El Segundo, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/831,053

(22) Filed: Dec. 4, 2017

(51) Int. Cl.
*G06F 3/00* (2006.01)
*G06F 5/00* (2006.01)
*G06F 13/12* (2006.01)
*G06F 13/38* (2006.01)
*G06F 5/14* (2006.01)
*G06F 13/16* (2006.01)
*G06F 13/42* (2006.01)

(52) U.S. Cl.
CPC ............ *G06F 5/14* (2013.01); *G06F 13/1673* (2013.01); *G06F 13/4243* (2013.01); *G06F 2205/126* (2013.01)

(58) Field of Classification Search
CPC .. G06F 12/0207; G06F 12/04; G06F 12/0607; G06F 13/16; G06F 13/28; G06F 9/3867; G06F 9/4494; G06F 13/1673; G06F 13/1689
USPC .................... 711/E12.003; 710/53, 68, 63, 7
See application file for complete search history.

(56) References Cited

U.S. PATENT DOCUMENTS

| | | | | |
|---|---|---|---|---|
| 3,649,763 A * | 3/1972 | Thompson | ............. | H04Q 11/06 370/372 |
| 4,355,405 A * | 10/1982 | Ruys | .................... | H04Q 1/4575 375/275 |
| 5,140,315 A * | 8/1992 | Edelson | ................. | G09G 5/026 345/611 |
| 5,245,226 A * | 9/1993 | Hood, Jr. | ........... | H03K 19/1737 326/47 |
| 5,481,656 A * | 1/1996 | Wakabayashi | ......... | G06K 15/00 358/1.13 |
| 5,724,537 A * | 3/1998 | Jones | .................. | G06F 12/0207 375/E7.094 |
| 6,034,542 A * | 3/2000 | Ridgeway | ............ | H03K 19/177 326/38 |
| 6,651,238 B1 * | 11/2003 | Wells | ................. | G01R 31/2853 716/103 |

(Continued)

*Primary Examiner* — Faisal M Zaman
(74) *Attorney, Agent, or Firm* — McDonnell Boehnen Hulbert & Berghoff LLP

(57) ABSTRACT

Example systems and related methods may relate to a synchronous first-in-first-out (FIFO) data buffer. The synchronous FIFO data buffer may include a counter. The counter may (i) receive a plurality of signals and (ii) output a count of total entries in the FIFO. The FIFO may further include a status generator that may (i) receive the plurality of signals and the count of total entries, and (ii) outputs a status signal. The FIFO may further include a selection generator that may (i) receive the count of total entries, the write signal, and the read signal, and (ii) output a data enable signal and a multiplexor selection signal. The FIFO may further include a scalable N×M flip-flop memory structure. N may be a number of entries in the memory structure and M may be a number of bits using flip-flops.

20 Claims, 5 Drawing Sheets

(56) References Cited

U.S. PATENT DOCUMENTS

| | | | |
|---|---|---|---|
| 2004/0085283 A1* | 5/2004 | Wang .................... | G09G 5/005 345/100 |
| 2004/0221249 A1* | 11/2004 | Lahner ................ | G06F 17/5022 716/102 |
| 2015/0095523 A1* | 4/2015 | Nishiyashiki ....... | G06F 13/4022 710/38 |

* cited by examiner

SYSTEMS AND METHODS FOR IMPLEMENTING A SYNCHRONOUS FIFO WITH REGISTERED OUTPUTS

BACKGROUND

Printing devices have become more complex in design and implementation. In most cases, print jobs are handled using a data buffer. For example, a printing device may receive multiple print jobs and use a data buffer to transfer printing information between multiple modules within the printing device to complete the print jobs. There are multiple types of data buffers, such as first-in, first-out (FIFO) data buffers. Using data buffers, printing systems may be able to determine an efficient order to complete the print jobs.

However, existing data buffers might not provide registered outputs, which may result in reduced power efficiency when different modules of a printing system are attempting to communicate with one another. Thus, a need exists for an efficient system and method of storing data that is scalable and provides registered outputs for use by modules in printing systems.

SUMMARY

In a first aspect, a synchronous FIFO data buffer is provided. The data buffer may include a counter. The counter may receive a plurality of signals, including a system clock signal, a reset signal, a write signal, and read signal. The counter may output a count of total entries in the FIFO. The data buffer may also include a status generator. The status generator may receive the plurality of signals and the count of total entries. The status generator may output a status signal. The data buffer may further include a selection generator. The selection generator may receive the count of total entries, the write signal, and the read signal. The selection generator may output a data enable signal and a multiplexor selection signal. The data buffer may further include a scalable N×M flip-flop memory structure. N may relate to a number of entries in the memory structure, and M may relate to a number of bits using flip-flops. Each entry of the N entries in the memory structure may include an M bit wide multiplexor. The multiplexor may receive the multiplexor selection signal, new write data to the FIFO, and a data output from a previous entry in the memory structure. The multiplexor may output the new write data. Each entry may also include a flip-flop bank. The flip-flop bank may receive the new write data, the data enable signal, and the system clock signal. The flip-flop bank may output a data output comprising information stored in the flip-flop bank.

In a second aspect, a method for implementing a synchronous FIFO data buffer is provided. The method may involve receiving, via a counter, a plurality of signals comprising a system clock signal, a reset signal, a write signal, and a read signal. The method may further involve transmitting, via the counter, a count of total entries in the FIFO. The method may further involve receiving, via a status generator, the plurality of signals and the count of total entries. The method further involves transmitting, via the status generator, a status signal. The method may further involve receiving, via a selection generator, the count of total entries from the counter, the write signal, and the read signal. The method may further involve transmitting, via the selection generator, a data enable signal and a multiplexor selection signal. The method may further involve receiving, via an M bit wide multiplexor within one entry of a scalable N×M flip-flop memory structure, the multiplexor selection signal, new write data to the FIFO, and a data output from a previous entry in the scalable N×M flip-flop memory structure. N may be a number of entries in the scalable N×M flip-flop memory structure, and M may be a number of bits using flip-flops. The method may further involve transmitting, via the M bit wide multiplexor, write data. The method may further involve receiving, via a flip-flop bank within one entry of the scalable N×M flip-flop memory structure, the write data, the data enable signal, and the system clock signal. The method may further involve transmitting, via the flip-flop bank, a data output comprising information stored in the flip-flop bank.

In a third aspect, a tangible, non-transitory computer-readable medium is provided. The tangible, non-transitory computer-readable medium includes program instructions encoded therein. The program instructions, when executed by one or more processors, cause a printing device to perform a method for implementing a synchronous FIFO data buffer. The method may involve receiving, via a counter, a plurality of signals comprising a system clock signal, a reset signal, a write signal, and a read signal. The method may further involve transmitting, via the counter, a count of total entries in the FIFO. The method may further involve receiving, via a status generator, the plurality of signals and the count of total entries. The method further involves transmitting, via the status generator, a status signal. The method may further involve receiving, via a selection generator, the count of total entries from the counter, the write signal, and the read signal. The method may further involve transmitting, via the selection generator, a data enable signal and a multiplexor selection signal. The method may further involve receiving, via an M bit wide multiplexor within one entry of a scalable N×M flip-flop memory structure, the multiplexor selection signal, new write data to the FIFO, and a data output from a previous entry in the scalable N×M flip-flop memory structure. N may be a number of entries in the scalable N×M flip-flop memory structure, and M may be a number of bits using flip-flops. The method may further involve transmitting, via the M bit wide multiplexor, write data. The method may further involve receiving, via a flip-flop bank within one entry of the scalable N×M flip-flop memory structure, the write data, the data enable signal, and the system clock signal. The method may further involve transmitting, via the flip-flop bank, a data output comprising information stored in the flip-flop bank.

Other aspects, embodiments, and implementations will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Data buffers are typically regions of a physical memory storage. Many devices and systems may implement data buffers to temporarily store data while it is being moved from one place to another. One example of a data buffer may include a music playlist. In this example, a user may select multiple songs to be played. The songs may be put in a buffer, or "queue," and played in the order the user selected the songs for playback. This is an example of a first-in, first-out (FIFO) data buffer.

Printing systems may use FIFO data buffers to handle print jobs submitted by users on a local area network (LAN). For instance, the printing system may receive print jobs faster than it is able to complete the print jobs. In this scenario, the printing system may (i) complete the first print job it receives, (ii) store the additional print jobs in a data buffer (e.g., a temporary place in memory), and after completing the first print job, (iii) retrieve a second print job from the data buffer, and (iv) complete the second print job.

In some circumstances, FIFO data buffers are implemented with an array of storage elements, write/read pointer logic, and a module to generate indications that the FIFO data buffer is full or empty. However, one problem these FIFO data buffers may encounter is that they are difficult to manufacture when a large number of multiplexors are needed when outputting data. Further, these FIFO data buffers might not allow for registered outputs. Thus, it may be beneficial, in some embodiments, to provide a FIFO data buffer that has flip-flop banks that has registered outputs, resulting in more reliable handling of print jobs.

II. System Examples

Figure 1:
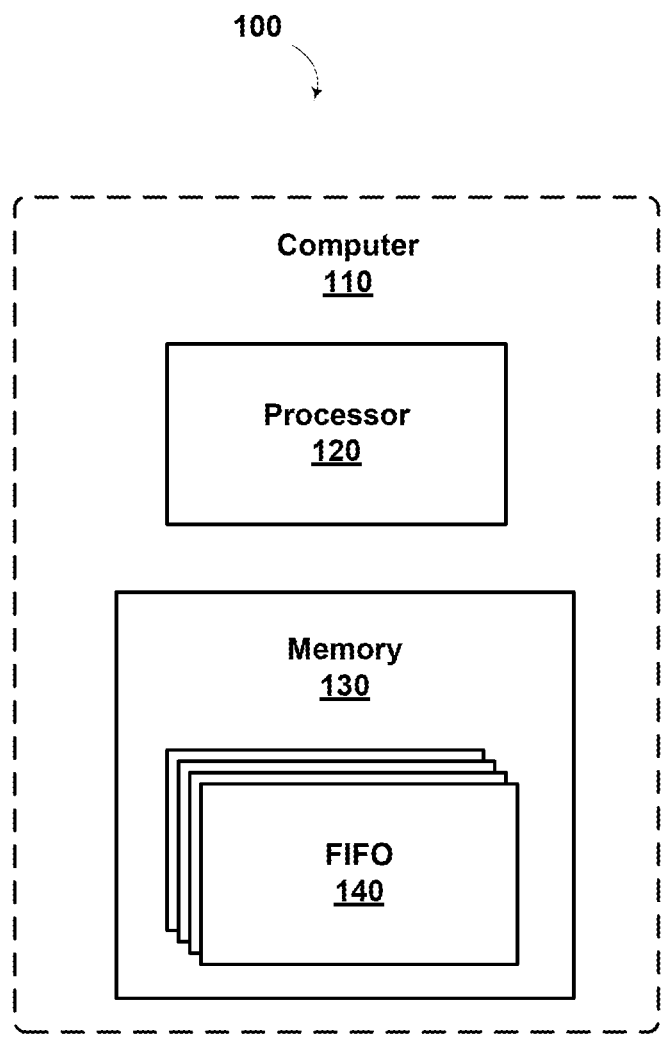
FIG. 1 is a schematic block diagram illustrating a computing system, according to an example embodiment.

FIG. 1 is a schematic block diagram illustrating a system 100, according to an example embodiment. System 100 includes a computer 110. System 100 may include a printing system, payment software system, or communication system, for example. Other types of computing systems exist and are contemplated.

Computer 110 may include a processor 120 and memory 130. Computer 110 may include computing devices configured to receive and process a print job. Computer 110 may have a processor 120 and a memory 130. For example, computer 110 may receive multiple requests to print documents and then send the instructions to print the document to a processor 120. Processor 120 may print one of the documents and send the other document to memory 130 for temporary storage. After printing the document, processor 120 may retrieve the other document from memory 130 and then print the other document.

Processor 120 may be disposed within computer 110 and may be configured to execute program instructions to handle various tasks (e.g., receiving and processing print jobs). Processor 120 may include an application specific integrated circuit ("ASIC"), which may be used to transfer data between different modules with either different clock frequencies or between modules with the same clock frequency but with different input and output data rates. Processor 120 may be configured to retrieve and store the print job in memory 130.

Memory 130 may be associated with an allocation of physical memory. Alternatively or additionally, memory 130 may be associated with a virtual and/or dynamic memory allocation. A portion of memory 130 may be configured to operate as FIFO data buffer (hereinafter "FIFO") 140. FIFO 140 may be a data structure in which the first and/or oldest entry is processed first, while the last and/or newest entry is processed last.

For example, in a printing system, FIFO 140 may be configured to have a maximum capacity of 10 print jobs. If a user submits six consecutive print jobs, FIFO 140 may store the first print job in a first entry, the second print job in a second entry, continuing until storing the sixth print job in a sixth entry. Processor 120 may retrieve the first print job from the first entry and send the first print job for printing. After the print job is completed, processor 120 may retrieve the second print job from the second entry and send the second print job for printing. This process may continue until all six print jobs are completed.

In another example, computer 110 may receive three print jobs. The print job may include a document or an image. Computer 110 may, via processor 120, execute program instructions to process the first print job, and store the second and third print jobs in FIFO 140 of memory 130. After processor 120 processes the first print job, it may retrieve the second print job from FIFO 140 of memory 130. Processor 120 may then process the second print job. After processor 120 processes the second print job, processor 120 may then retrieve and process the third print job.

Figure 2:
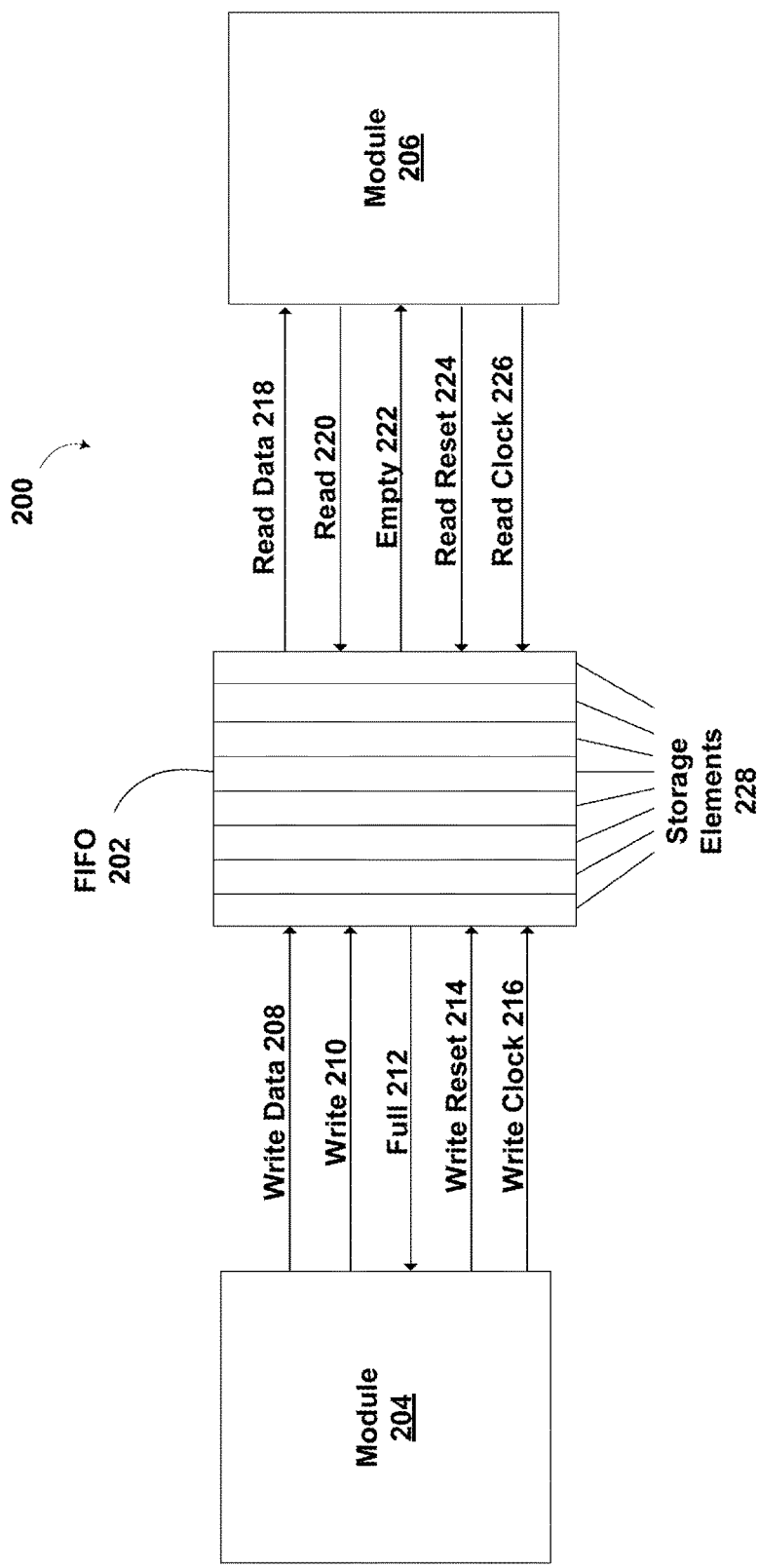
FIG. 2 is a schematic block diagram illustrating a system using an asynchronous FIFO data buffer, according to an example embodiment.

FIG. 2 is a schematic block diagram illustrating an asynchronous FIFO data buffer, according to an example embodiment. System 200 may represent a communication protocol between two modules via an asynchronous FIFO data buffer. System 200 may be implemented in hardware or through an ASIC. System 200 may include FIFO 202, module 204, and module 206.

FIFO 202 may include storage elements 228. The number of storage elements 228 in FIFO 202 may be customizable depending on the needs of system 200. FIFO 202 may include a write interface and a read interface. The write interface may be connected to module 204, and the read interface may be connected to module 206.

Module 204 may include a component that wants to write data to FIFO 202. For example, module 204 may include processor 120 from FIG. 1. Module 204 communicates to FIFO 202's write interface via write data bus 208, write signal 210, full signal 212, write reset signal 214, and write clock signal 216. Write data bus 208 may include the data module 204 wishes to store in FIFO 202 (e.g., a print job). Write signal 210 may include an indication that module 204 is currently writing the data stored in write data bus 208 into one of storage elements 228. Full signal 212 may include an indication that FIFO 202 might not have any available storage elements 228 for which to write data. Write reset signal 214 may include an indication that module 204 wishes to initialize or re-initialize the write logic of FIFO 202. Write clock signal 216 may include the clock signal from module 204.

Module 206 may include a component is configured to read data from FIFO 202. For example, module 206 may include processor 120 from FIG. 1, or another hardware component configured to retrieve data from FIFO 202. In some circumstances, module 204 and module 206 may be the same hardware component. Module 206 communicates to FIFO 202's read interface via read data bus 218, read signal 220, empty signal 222, read reset signal 224, and read clock signal 226. Read data bus 218 may include the data module 206 wishes to read and/or retrieve from FIFO 202 (e.g., a print job). Read signal 220 may include an indication that module 206 is currently reading the data stored in read data bus 218 from one of storage elements 228. Empty signal 222 may include an indication that FIFO 202 might not have any data stored in storage elements 228 from which to read data. Read reset signal 224 may include an indication that module 206 wishes to initialize or re-initialize the read logic of FIFO 202. Read clock signal 226 may include the clock signal from module 206.

In operation, module 204 (e.g., processor 120, other hardware, etc.) may receive a print job. Module 204 may divide the print job into multiple data segments for storage in FIFO 202. Module 204 may check full signal 212 to determine whether FIFO 202 has sufficient memory to store the data segments. Once module 204 determines full signal 212 is deasserted, indicating FIFO 202 is not full, module 204 may assert write signal 210 and begin sending data segments via write data bus 208. To accomplish this, module 204 may point write data bus 208 to the location of the data packets within FIFO 202, then assert write signal 210 for the duration of one write clock signal 216 (e.g., from one rising edge of the clock signal to another rising edge of the clock signal). The real-time duration of one write clock signal 216 may depend on the processing capabilities of system 200. Module 204 fills one of storage elements 228 during one write clock signal.

After module 204 has stored all of the data segments into FIFO 204, module 206 may determine it wants to retrieve the data segments from FIFO 202 to print the information stored in the data segments. To retrieve the data segments from FIFO 202, module 206 may check empty signal 222 to determine that FIFO 202 has data stored to retrieve (e.g., not empty). Once module 206 determines empty signal 222 is deasserted, indicating FIFO 202 is not empty, module 206 may assert read signal 220 and begin reading the data segments via read data bus 218. To accomplish this, module 206 may point read data bus 218 to the location of the data segments within FIFO 202 and then assert read signal 220 for the duration of one read clock signal 226. The real-time duration of one read clock signal 226 may depend on the processing capabilities of system 200. The real-time duration of one write clock signal 216 and one read clock signal 226 may be different, which makes FIFO 202 an example of an asynchronous FIFO data buffer. After module 206 has read all of the data stored in FIFO 202, FIFO 202 may assert empty signal 222 indicating FIFO 202 no longer has data stored in storage elements 228.

Figure 3:
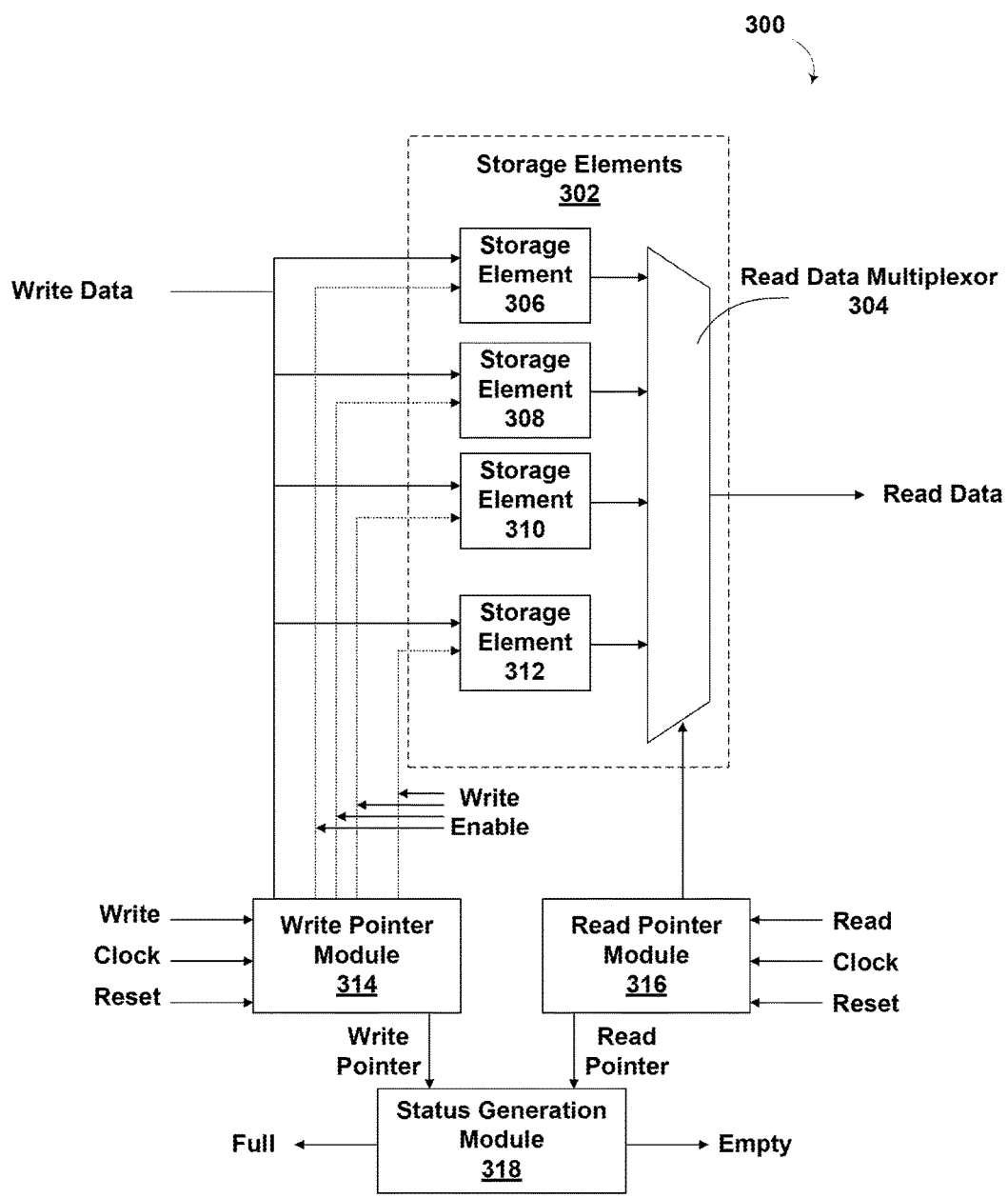
FIG. 3 is a schematic block diagram illustrating a synchronous FIFO data buffer, according to an example embodiment.

FIG. 3 is a schematic block diagram illustrating a synchronous FIFO data buffer 300, according to an example embodiment. In a synchronous FIFO data buffer, all modules are controlled by the same clock signal.

Synchronous FIFO data buffer 300 may include storage elements 302, write pointer module 314, read pointer module 316, and status generation module 318.

Storage elements 302 may implemented in the form of static random access memory ("SRAM") or an array of flip-flops. Typically, synchronous FIFO data buffers with a depth greater than 32 and a width greater than 256 may be implemented using SRAM. Similarly, synchronous FIFO data buffers with a smaller depth and/or width may be implemented with an array of flip-flops. Synchronous FIFO data buffer 300 in FIG. 3 is implemented with an array of flip-flops. Storage elements 302 may include storage elements 306, 308, 310, and 312.

Write pointer module 314 may keep track of the location where the next data entry may reside in storage elements 302. To accomplish this, write pointer module 314 asserts the appropriate write enable signal corresponding to one of storage elements 306, 308, 310, and 312. The write pointer is incremented following an assertion of the write signal upon the rising edge of the clock signal. For example, when synchronous FIFO data buffer 300 is empty, write pointer module 314 may assert the write enable signal that corresponds to storage element 306, indicating the next write data should be stored in storage element 306. On the next rising edge of the clock signal, the data in the write data bus is stored in storage element 306. After the write data bus is stored in storage element 306, write pointer module 314 may deassert the write enable signal corresponding to storage element 306 and assert the write enable signal corresponding to storage element 308. The storage location of write pointer module 314 is tracked using a counter that has a value from 0 to N−1, with N being the number of storage elements in storage elements 302. The counter may implemented as the write pointer or read pointer. The counter may rollover once the maximum count has been reached. For example, if the counter has two bits, the counter may increment by one from zero to three and then rollover back to zero. In FIG. 3, N is 4 because there are four storage elements (e.g., storage elements 306, 308, 310, and 312).

In operation, when data is to be stored in synchronous FIFO data buffer 300, the write signal may be asserted by a module connected to synchronous FIFO data buffer 300 (not shown in FIG. 3). When the write enable signal is asserted for storage element 306, the data contained in the write data bus may be stored in storage element 306 on the rising edge of the clock signal. After the data is stored in storage element 306, the counter for write pointer module 314 may be incremented, the write enable signal corresponding to storage element may be deasserted, and the write enable signal for storage element 308 may be asserted. On the next rising edge of the clock, the data remaining in the write data bus may be stored in storage element 308. This operation continues until either no more data remains in the write data bus or the synchronous FIFO data buffer 300 is full.

Read pointer module 316 may keep track of the location of the next storage element from which to read data. This may be accomplished by sending the read pointer to read data multiplexor 304. The read pointer uses a similar pointer logic as implemented in write pointer module 314, however the read and write pointer operate independent of one another. The read pointer is incremented following an assertion of the read signal upon the rising edge of the clock signal. Similar to the write pointer, the read pointer may rollover once the maximum count has been reached. For example, if the counter is initialized at 0 and two write actions are performed, data is stored in storage elements 306 and 308 and the counter value is 2. The write pointer may point to storage element 310, but the read pointer may point to storage element 306.

In operation, read data multiplexor 304 receives the read pointer value and outputs the data associated with the storage element the read pointer indicates as part of the read data bus. Once this read action is performed, the read pointer points to the next location of stored data to be output. These actions may continue until all data is read from synchronous FIFO data buffer 300, resulting in synchronous FIFO data buffer 300 being empty.

Status generation module 318 may generate the synchronous FIFO data buffer 300's full and empty signals, which may be based on whether there is data stored in storage elements 302 from which to read or write. This may be accomplished by comparing the read and write pointers. The read and write pointers may both include a rollover status bit (e.g., a binary toggle bit with a flagged and unflagged state). The roller over status bit may initialize as unflagged and become flagged when the read or write pointer reaches its maximum number and rolls back to zero, as described above.

Synchronous FIFO data buffer 300 may generate an empty signal when both the read and write pointers are the same and their respective rollover bits are in the same state (e.g., both flagged or unflagged). Synchronous FIFO data buffer 300 may generate a full signal when both the read and write pointers are the same but their respective rollover bits are in different states (e.g., one is flagged and the other is unflagged).

In some circumstances, using FIFOs with write and read pointer logic can be inefficient because the processor allocates processing power to keep track of the location of the write and read pointers. Further, the outputs of FIFOs that utilize write and read pointer logic may not be registered (e.g., originate from a data register), which may increase the instability of the FIFO because data is more likely to be overwritten or corrupted. To address this potential problem, in some embodiments, it may be beneficial to implement a scalable synchronous FIFO data buffer with fully registered outputs. This may include a FIFO data buffer that has a customizable depth and width and outputs (e.g., an N number of entries deep, and an M number of entries wide). A scalable synchronous FIFO data buffer may have registered outputs at each element of the FIFO, which may result in more efficient and stable data management.

Figure 4:
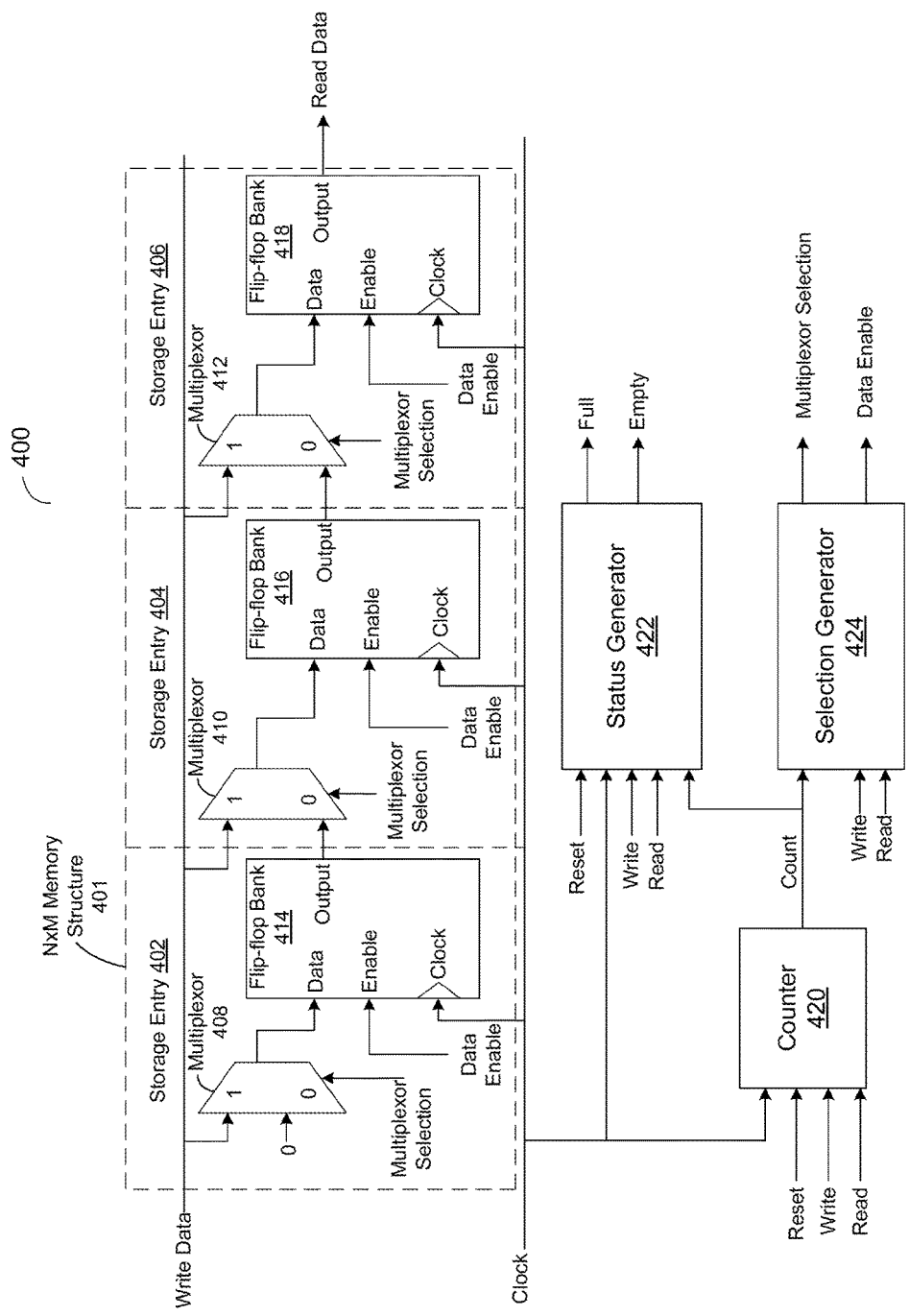
FIG. 4 is a schematic block diagram illustrating a scalable synchronous FIFO data buffer, according to an example embodiment.

FIG. 4 is a schematic block diagram illustrating a scalable synchronous FIFO data buffer with registered outputs 400, according to an example embodiment. Scalable synchronous FIFO data buffer 400 may include N×M memory structure 401, counter 420, status generator 422, and selection generator 424. Scalable synchronous FIFO data buffer 400 may receive a plurality of signals from other hardware modules that wish to use scalable synchronous FIFO data buffer 400 for temporary data storage. These signals may include, but are not limited to, (i) write data containing data to be stored, (ii) a reset signal, (iii) a write signal, (iv) a read signal, and (v) a system clock signal. The reset signal may either be in an asserted or deasserted state and may include a command to reset synchronous FIFO data buffer 400 by emptying all data currently stored. The write signal may either be in an asserted or deasserted state and may indicate data a request to write data in synchronous FIFO data buffer 400. The read signal may either be in an asserted or deasserted state and may indicate a request to read data from synchronous FIFO data buffer 400. The system clock signal is a signal that oscillates between a high and low state, coordinating the actions of synchronous FIFO data buffer 400. Scalable synchronous FIFO data buffer 400 may be additionally or alternatively referred to as FIFO 400 throughout this description.

N×M memory structure 401 may include storage entries 402, 404, and 406, which may include multiplexors 408, 410, and 412, and flip-flop banks 414, 416, and 418, respectively. N corresponds to the depth of the memory structure and M corresponds to the width of the memory structure. The depth and width of the memory structure can be customized during manufacturing of the hardware on which N×M memory structure 401 is located.

Storage entries 402, 404, and 406 represent storage elements within N×M memory structure 401 to which data can be stored. A hardware module may write and/or read data directly to the storage elements without the need of a write or read interface.

Multiplexors 408, 410, and 412 may be M bit wide multiplexors configured to (i) receive multiple inputs and a selection signal, and (ii) output data. Multiplexors 408, 410, and 412 can be set to have a width of 1 to M bits, where M is the width of scalable synchronous FIFO data buffer 400.

Flip-flop banks 414, 416, 418 may be groups of connected flip-flops configured to store data. Each of flip-flop banks 414, 416, and 418 may store information as small as a single bit, up to the number of bits customized by the parameter M. For example, if the scalable synchronous FIFO data buffer 400 is initialized to be 50 entries deep and 8 bits wide, each flip-flop bank may store information from 1 to 8 bits.

Counter 420 is a module tasked with maintaining a count value relating to the number of storage entries that are occupied in N×M memory structure 401. Counter 420 is comprised of a number of flip-flops that store the count value. The number of flip-flops used to store the count value may correspond to the ceiling of the following equation: $\log_2 N$, where N is the number of entries that may be used in FIFO 400 for a particular set of data. For example, if the data requires four entries in FIFO 400, the counter value may be stored in two flip-flops. In another example, if the data requires five entries in FIFO 400, the counter value may be stored in three flip-flops. Counter 420 maintains the count value by incrementing the count value when new entries are added to FIFO 400, and decrementing the count value when entries are read and removed from FIFO 400. Counter 420 performs the incrementing and/or decrementing action on the residing edge of the clock connected to FIFO 400. As discussed previously, all elements of FIFO 400 share the same clock signal since FIFO 400 is an example of a synchronous FIFO.

In operation, counter 420 begins its operation on the rising edge of the clock signal. If the reset signal is asserted, counter 420 may reset the count value to zero. If the read signal is asserted (e.g., data is being read from FIFO 400 on this clock cycle) and the write signal is deasserted (e.g., no data is being written to FIFO 400 on this clock cycle), counter 420 may decrement the count value by one. Further, if the write signal is asserted (e.g., data is being written to FIFO 400) and the read signal is deasserted (e.g., data is not being read from FIFO 400), counter 420 may increment the count value by one. Additionally, if both the read and write signals are asserted or deasserted (e.g., data is being written to and read from FIFO 400, or data is not being read from or written to FIFO 400), counter 420 might not change the count value.

Status generator 422 is tasked with generating the full and empty signals for FIFO 400. The full signal is an indication that there are no more available storage entries in FIFO 400 in which to store data. The empty signal is an indication that none of the storage entries in FIFO 400 have data from which to read. Status generator 422 receives the count value from counter 420, and the reset, write, and read signals from the component or hardware communicating with FIFO 400. Status generator 422, along with the other components of FIFO 400, performs its operations on the rising edge of the clock signal.

Status generator 422 may deassert the full signal if the reset signal received by status generator 422 is asserted.

Status generator 422 may assert the full signal if (i) the count value received from counter 420 is equal to one less than the number of storage entries in N×M memory structure 401, (ii) the write signal is asserted, and (iii) the read signal is deasserted. Status generator 422 may deassert the full signal if (i) the full signal is already asserted, (ii) the read signal is asserted, and (iii) the write signal is deasserted. If the above conditions are not met, status generator 422 might not assert or deassert the full signal, leaving the full signal in the same state it was in before status generator 422 performed its operations.

Status generator 422 may assert the empty signal if the reset signal received by status generator 422 is asserted. Status generator 422 may also assert the empty signal if (i) the count value is equal to 1, (ii) the read signal is asserted, and (iii) the write signal is deasserted. Status generator 422 may deassert the empty signal if (i) the read signal is deasserted and (ii) the write signal is asserted. If the above conditions are not met, status generator 422 might not assert or deassert the empty signal, leaving the empty signal in the same state it was in before status generator 422 performed its operations. In operation, when FIFO 400 is initialized, status generator 422 may assert the empty signal because no data is stored in FIFO 400.

In one example, FIFO 400 may have four storage entries, three of which are storing data. In this example, status generator 422 would not assert the full signal nor the empty signal. However, if status generator 422 receives an asserted write signal and deasserted read signal, status generator 422 may assert the full signal on the next rising edge of the clock signal because FIFO 400 would have all data stored in all available storage entries. If the next operation for FIFO 400 is to read data out of FIFO 400, and the full signal is asserted, then status generator 422 may deassert the full signal on the next rising clock edge after the data is read from FIFO 400.

Selection generator 424 may be tasked with generator a flip-flop enable and multiplexor selection signal for each storage entry in N×M memory structure 401. The flip-flop data enable signal may include an indication to one of flip-flop banks 414, 416, and/or 418 to store data on the next rising clock edge. The multiplexor selection signal may include an indication to multiplexors 408, 410, and/or 412 to route the write data bus connected to the "1" input to the output.

In operation, selection generator 424 receives the counter value from counter 420, and the write and read signals from the module or hardware component that is communication with FIFO 400. Selection generator 424 may assert or deassert the multiplexor selection and data enable signals for each storage entry in N×M memory structure 401 according to the following behavior: for each of storage entries 402, 404, and 406 of N×M memory structure 401, selection generator 424 may assert the multiplexor selection signal if the count value is equal to an index value of the storage entry in N×M memory structure 401 or if (i) the write signal is asserted, (ii) the read signal is asserted, and (iii) the count value is one greater than the index value of the storage entry in N×M memory structure 401. Selection generator 424 may deassert the multiplexor selection signal if none of the above conditions are satisfied.

Selection generator 424 may assert or deassert the flip-flop data enable signal for each storage entry in N×M memory structure 401 according to the following behavior: for each of storages entries 402, 404, and 406 of N×M memory structure 401, selection generator 424 may assert the data enable signal if (i) the count value is equal to the index value of the storage entry and (ii) the write signal is asserted. Selection generator 424 may also assert the data enable signal if the read signal is asserted. If none of the conditions above are met, selection generator 424 may deassert the data enable signal.

For example, storage entry 406 may have an index value of 0, storage entry 404 may have an index value of 1, and storage entry 402 may have an index value of 2. Selection generator 424 may first determine whether to assert or deassert the multiplexor signal for storage entry 406. If the count value received from counter is 0, which matches the index value of 0 for storage entry 406, selection generator 424 may assert the multiplexor selection signal for storage entry 406. Additionally, if the write signal and read signal received by selection generator 424 are asserted and the count value is 1 (e.g., one greater than storage entry 406's index value of 0), selection generator 424 may assert the multiplexor selection signal for storage entry 406. However, if the above conditions are not satisfied, selection generator 424 may deassert the multiplexor selection signal. Selection generator 424 may assert the data enable signal for storage entry 406 if (i) the count value received from counter is 0, which matches the index value of 0 for storage entry 406, and (ii) the write signal is asserted. If the count value does not match the index value, selection generator 424 may still assert the data enable signal if the read signal is asserted. However, if the above conditions for asserting the data enable are not met, selection generator 424 may deassert the data enable signal for storage entry 406. This process may be repeated for storage entries 404 and 402.

In one example embodiment, the processor may use FIFO 400 to temporarily store data. As previously discussed and shown in FIG. 4, FIFO 400 may have N×M memory structure 401, counter 420, status generator 422, and selection generator 424. When initialized, counter 420 may set the count value to zero, status generator 422 may assert the empty signal and deassert the full signal, and selection generator 424 may assert the multiplexor selection and data enable signals for storage entry 406. Selection generator 424 may deassert the multiplexor selection and data enable signals for storage entries 404 and 402.

FIFO 400 may then receive an asserted write signal from the processor, indicating it wishes to store data in FIFO 400. Multiplexor 412 of storage entry 406 may (i) receive the data to be stored through the write data bus and the asserted multiplexor selection signal, and (ii) store the data into flip-flop bank 418. Counter 420 may receive the asserted write signal and increment the count value from zero to one. Status generator 422 may receive the asserted write signal and may deassert the empty signal.

FIFO 400 may then receive an asserted read signal and deasserted write signal, indicating the data stored in storage entry 406 is now to be outputted and there is no new data to store. Counter 420 may receive the asserted read signal and decrement the count value from one to zero. Status generator 422 may receive the asserted read signal and may assert the empty signal because after the data is outputted, FIFO 400 might be empty. Selection generator 424 may receive the asserted read signal and assert both the multiplexor selection signal and data enable signal. Flip-flop bank 418 may output valid data to the Read Data signal if the status of FIFO 400 is not empty. The output from flip-flop bank 418 is a registered output.

III. Method Examples

Figure 5:
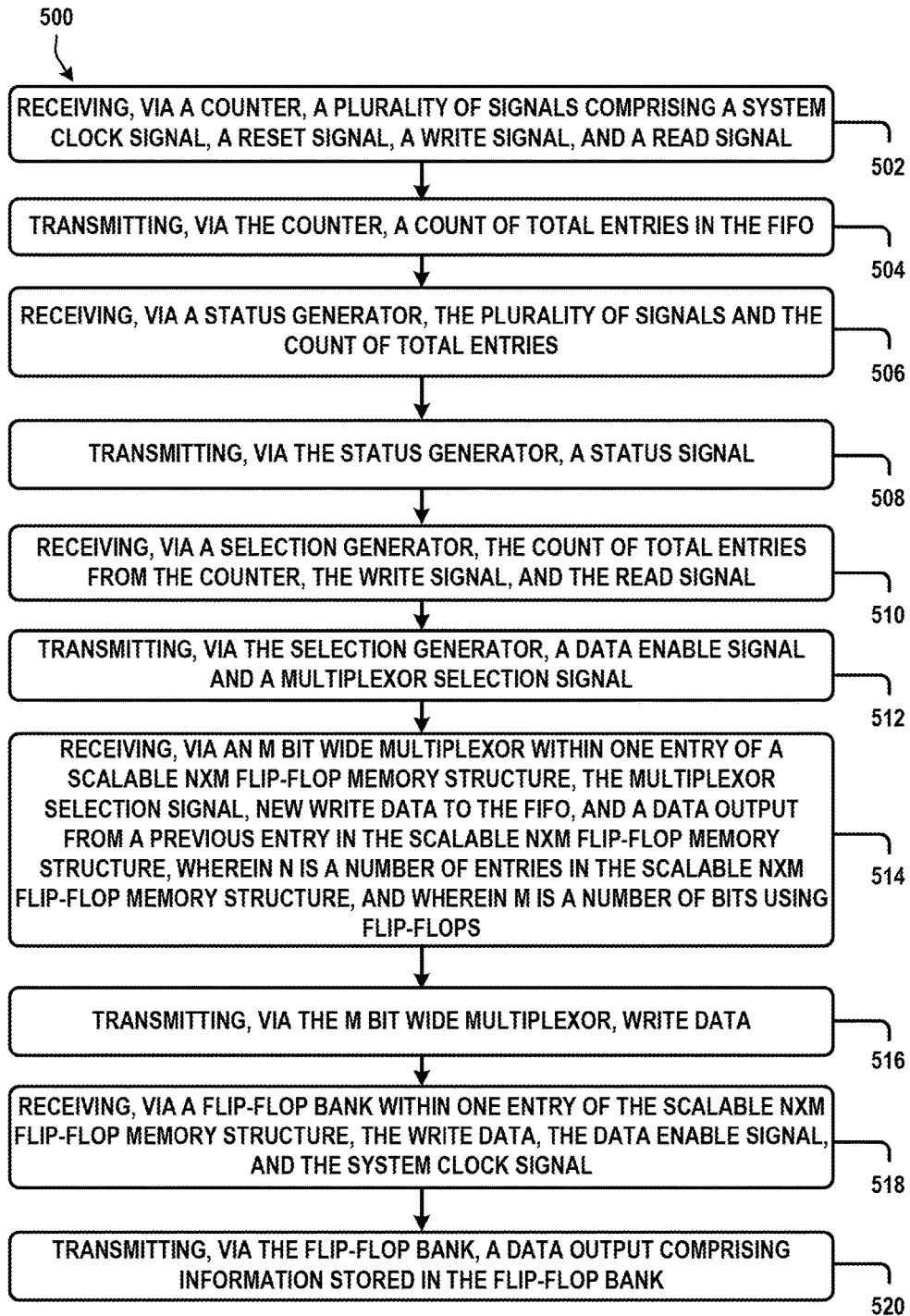
FIG. 5 is a flow diagram illustrating a method, according to an example embodiment.

FIG. 5 illustrates a method, according to an example embodiment. The method includes blocks that may be carried out in an order other than that illustrated. Further-more, various blocks may be added to or subtracted from the described methods within the intended scope of this disclosure. The methods may correspond to steps that may be carried out using some or all of the elements of system 200, FIFO 300, and/or FIFO 400, as illustrated and described in reference to FIGS. 2-4.

FIG. 5 is a flow diagram illustrating a method 500, according to an example embodiment. Method 500 describes how a scalable synchronous FIFO data buffer operates. Block 502 may include receiving, via a counter, a plurality of signals comprising a system clock signal, a reset signal, a write signal, and a read signal.

Block 504 may include transmitting, via the counter, a count of total entries in the FIFO.

Block 506 may include receiving, via a status generator, the plurality of signals and the count of total entries.

Block 508 may include transmitting, via the status generator, a status signal.

Block 510 may include receiving, via a selection generator, the count of total entries from the counter, the write signal, and the read signal.

Block 512 may include transmitting, via the selection generator, a data enable signal and a multiplexor selection signal.

Block 514 may include receiving, via an M bit wide multiplexor within one entry of a scalable N×M flip-flop memory structure, the multiplexor selection signal, new write data to the FIFO, and a data output from a previous entry in the scalable N×M flip-flop memory structure. N may be a number of entries in the scalable N×M flip-flop memory structure. M may be a number of bits using flip-flops.

Block 516 may include transmitting, via the M bit wide multiplexor, write data.

Block 518 may include receiving, via a flip-flop bank within one entry of the scalable N×M flip-flop memory structure, the write data, the data enable signal, and the system clock signal.

Block 520 may include transmitting, via the flip-flop bank, a data output comprising information stored in the flip-flop bank.

In some embodiments, the previous entry in the scalable N×M flip-flop memory structure may be entry N−1.

In some embodiments, the counter may include a number of flip-flops equal to $\log_2(N)$.

In some embodiments, the counter may operate on a rising edge of the system clock signal.

In some embodiments, the status signal may consist of either a full signal or an empty signal.

In some embodiments, the flip-flop bank of the scalable N×M flip-flop memory structure may store a number of bits in a range of 1 to M.

While various examples and embodiments have been disclosed, other examples and embodiments will be apparent to those skilled in the art. The various disclosed examples and embodiments are for purposes of illustration and are not intended to be limiting, with the true scope and spirit being indicated by the following claims.

What is claimed is:

1. A synchronous first-in-first-out (FIFO) data buffer, comprising:
    a counter, wherein the counter receives a plurality of signals comprising a system clock signal, a reset signal, a write signal, and read signal, wherein the counter outputs a count of total entries in the FIFO;
    a status generator, wherein the status generator receives the plurality of signals and the count of total entries, and wherein the status generator outputs a status signal;
    a selection generator, wherein the selection generator receives the count of total entries, the write signal, and the read signal, and wherein the selection generator outputs a data enable signal and a multiplexor selection signal; and
    a scalable N×M flip-flop memory structure, wherein N is a number of entries in the memory structure, wherein M is a number of bits using flip-flops, and wherein each entry of the N entries in the memory structure comprises:
        an M bit wide multiplexor, wherein the multiplexor receives the multiplexor selection signal, new write data to the FIFO, and a data output from a previous entry in the memory structure, and wherein the multiplexor outputs write data; and
        a flip-flop bank, wherein the flip-flop bank receives the write data, the data enable signal, and the system clock signal, and wherein the flip-flop bank outputs a data output comprising information stored in the flip-flop bank.

2. The synchronous FIFO data buffer of claim 1, wherein the previous entry in the memory structure is entry N−1.

3. The synchronous FIFO data buffer of claim 1, wherein the counter comprises a number of flip-flops equal to $\log_2(N)$.

4. The synchronous FIFO data buffer of claim 1, wherein the counter operates on a rising edge of the system clock signal.

5. The synchronous FIFO data buffer of claim 1, wherein the status signal consists of either a full signal or an empty signal.

6. The synchronous FIFO data buffer of claim 1, wherein the flip-flop bank of the scalable N×M flip-flop memory structure stores a number of bits in a range of 1 to M.

7. The synchronous FIFO data buffer of claim 1, wherein a width of the M bit wide multiplexor of the scalable N×M flip-flop memory structure is 1 to M bits.

8. The synchronous FIFO data buffer of claim 1, wherein the flip-flop bank of the scalable N×M flip-flop memory structure further stores the write data on a rising edge of the system clock signal.

9. A method for implementing a synchronous first-in-first-out (FIFO) data buffer, comprising:
    receiving, via a counter, a plurality of signals comprising a system clock signal, a reset signal, a write signal, and a read signal;
    transmitting, via the counter, a count of total entries in the FIFO;
    receiving, via a status generator, the plurality of signals and the count of total entries;
    transmitting, via the status generator, a status signal;
    receiving, via a selection generator, the count of total entries from the counter, the write signal, and the read signal;
    transmitting, via the selection generator, a data enable signal and a multiplexor selection signal;
    receiving, via an M bit wide multiplexor within one entry of a scalable N×M flip-flop memory structure, the multiplexor selection signal, new write data to the FIFO, and a data output from a previous entry in the scalable N×M flip-flop memory structure, wherein N is a number of entries in the scalable N×M flip-flop memory structure, and wherein M is a number of bits using flip-flops;
    transmitting, via the M bit wide multiplexor, write data;

receiving, via a flip-flop bank within one entry of the scalable N×M flip-flop memory structure, the write data, the data enable signal, and the system clock signal; and transmitting, via the flip-flop bank, a data output comprising information stored in the flip-flop bank.

10. The method of claim 9, wherein the previous entry in the scalable N×M flip-flop memory structure is entry N−1.

11. The method of claim 9, wherein the counter comprises a number of flip-flops equal to $\log_2(N)$.

12. The method of claim 9, wherein the counter operates on a rising edge of the system clock signal.

13. The method of claim 9, wherein the status signal consists of either a full signal or an empty signal.

14. The method of claim 9, wherein the flip-flop bank of the scalable N×M flip-flop memory structure stores a number of bits in a range of 1 to M.

15. A tangible, non-transitory computer-readable medium comprising program instructions encoded therein, wherein the program instructions, when executed by one or more processors, cause a printing device to perform a method for implementing a synchronous FIFO data buffer comprising:

receiving, via a counter, a plurality of signals comprising a system clock signal, a reset signal, a write signal, and a read signal transmitting, via the counter, a count of total entries in the FIFO;

receiving, via a status generator, the plurality of signals and the count of total entries;

transmitting, via the status generator, a status signal;

receiving, via a selection generator, the count of total entries from the counter, the write signal, and the read signal;

transmitting, via the selection generator, a data enable signal and a multiplexor selection signal;

receiving, via an M bit wide multiplexor within one entry of a scalable N×M flip-flop memory structure, the multiplexor selection signal, new write data to the FIFO, and a data output from a previous entry in the scalable N×M flip-flop memory structure, wherein N is a number of entries in the scalable N×M flip-flop memory structure, and wherein M is a number of bits using flip-flops;

sending, via the M bit wide multiplexor, write data;

receiving, via a flip-flop bank within one entry of the scalable N×M flip-flop memory structure, the write data, the data enable signal, and the system clock signal; and transmitting, via the flip-flop bank, a data output comprising information stored in the flip-flop bank.

16. The tangible, non-transitory computer-readable medium of claim 15, wherein the previous entry in the scalable N×M flip-flop memory structure is entry N−1.

17. The tangible, non-transitory computer-readable medium of claim 15, wherein the counter comprises a number of flip-flops equal to $\log_2(N)$.

18. The tangible, non-transitory computer-readable medium of claim 15, wherein the counter operates on a rising edge of the system clock signal.

19. The tangible, non-transitory computer-readable medium of claim 15, wherein the status signal consists of either a full signal or an empty signal.

20. The tangible, non-transitory computer-readable medium of claim 15, wherein the flip-flop bank of the scalable N×M flip-flop memory structure stores a number of bits in a range of 1 to M.

* * * * *